April 5, 1932.  A. S. KROTZ  1,852,120
CULTIVATOR
Filed June 10, 1926  6 Sheets-Sheet 1

Fig. 1.

Witness
Martin H. Olsen.

Inventor
Alvaro S. Krotz
By Rector, Hibben, Davis & Macauley
His Attys

Patented Apr. 5, 1932

1,852,120

UNITED STATES PATENT OFFICE

ALVARO S. KROTZ, OF LOMBARD, ILLINOIS, ASSIGNOR, BY MESNE ASSIGNMENTS, TO THE MASSEY-HARRIS COMPANY, A CORPORATION OF MARYLAND

CULTIVATOR

Application filed June 10, 1926. Serial No. 114,889.

My invention relates to a three row cultivator more particularly designed for cultivating corn, planted in trenches, or, as it is commonly called, listed. It is also adapted, however, for other purposes, as for "ridge busting," to-wit, leveling the ground after it has been listed or ridged by throwing the dirt constituting the ridges into the adjacent trenches or hollows. It is the object of the inventor to provide such a cultivator to be drawn by a tractor, the connection being such that the tractor is free to turn to left or right and move over uneven ground, the implement being unaffected by the minor movements of the tractor, but being guided by the general direction of movement of the latter; and the gang units being free to follow the several trenches or ridges upon which they are respectively working, but at the same time so connected to each other and to the frame as to preserve their upright position and that of the frame thus preventing material tilting thereof, and to maintain the alignment of their ground working devices with the general direction of travel of the implement as a whole. Other features of advantage and invention of my improved implement will be gathered from the following description and claims and the drawings attached to and forming a part hereof; it is to be understood however that the specific disclosure is for the purpose of exemplification only and that the scope of the invention is defined in the claims in which I have endeavored to distinguish it from the prior art without, however, relinquishing or abandoning any patentable matter.

In the drawings

Each part is identified by the same reference character wherever it is found in the several views.

Figure 1:
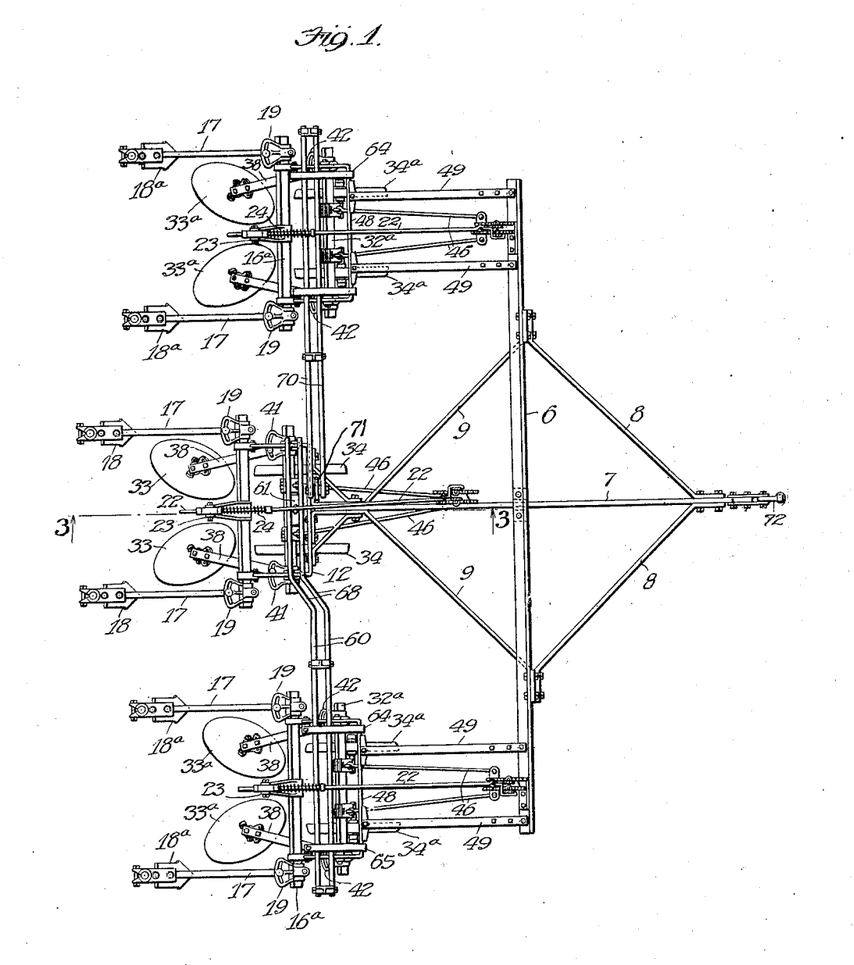
Fig. 1 is a plan view of a preferred embodiment of my invention.
Figure 2:
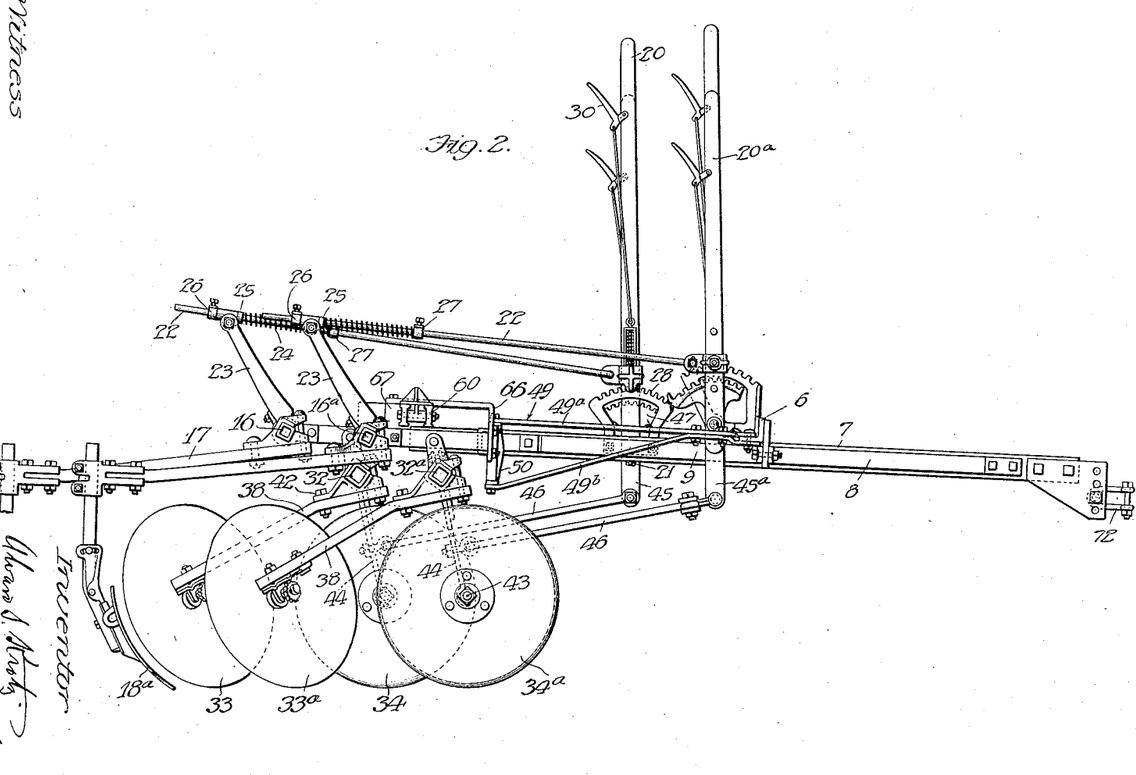
Fig. 2 a side elevation thereof.

Referring first more particularly to Figures 1 and 2, the main frame will be seen to comprise a lateral beam 6, a longitudinal beam 7 and brace bars 8 and 9. The latter are bolted to beam 7 towards their near inner ends at 10 and extend beyond this point parallel to beam 7 and are bent outward therefrom at their extreme ends at 11, 11 and bolted to the U-shaped bar 12. Braces 13, 13 serve to assist in holding the U-bar in position.

Figure 3:
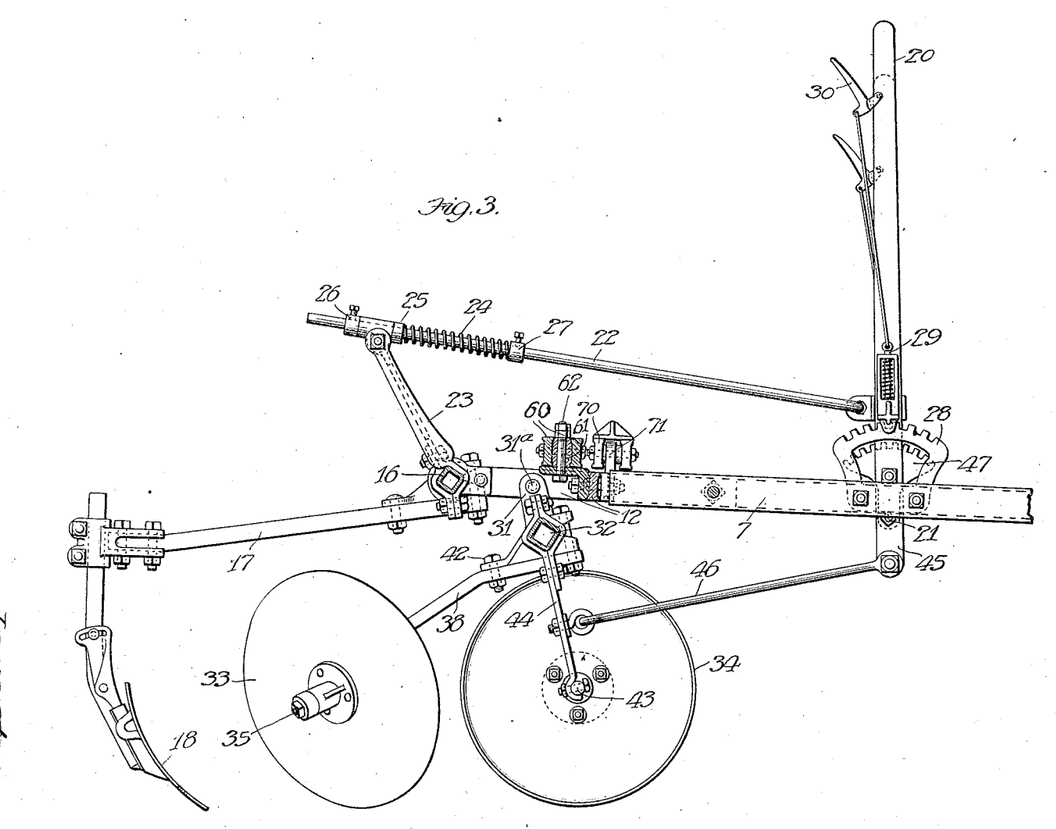
Fig. 3 is a vertical section on the plane of the line 3—3 of Fig. 1.
Figure 5:
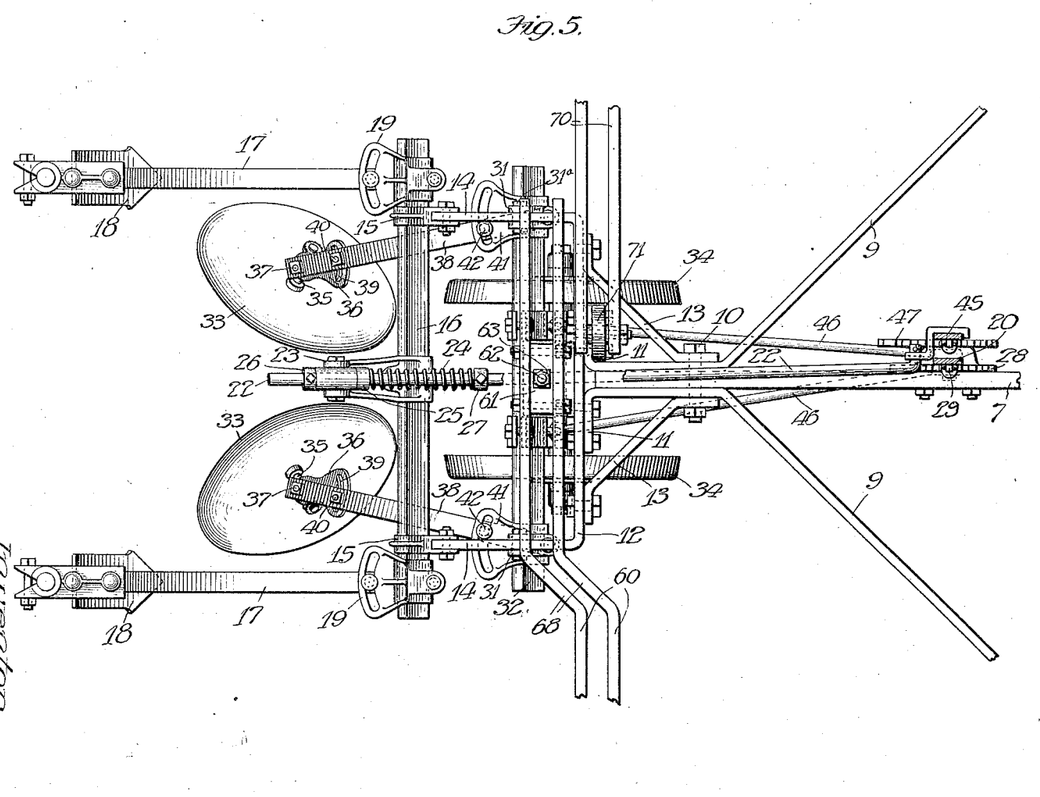

The ends 14, 14 of the U-bar extend rearwardly and to their ends are pivoted the brackets 15, 15 for the square bar 16 to which, in turn, are secured the beams 17, 17 of the shovels, 18, 18 of the middle or rudder gang, (see Figs. 3 and 5). The beams are secured to the bar by brackets 19 of the well known form having curved slots, and bolts for lateral angular adjustment of the beams. To adjust the vertical position of tools 18 with respect to the frame the bar 16 may be angularly adjusted by means of the hand lever 20, pivoted on the longitudinal beam 7 at 21 and connected by rod 22 to arm 23 secured on said square bar 16 (see Fig. 3). The usual cushion spring 24 is provided on rod 22, which latter extends through a sleeve 25 pivoted on arm 23, said sleeve and spring being between limiting collars 26, 27. An adjusting rack 28, pawl 29 and trigger 30 are provided for locking lever 20 in adjusted position.

Intermediate the transverse member of the U-bar and the ends of the side members thereof, brackets 31 are pivoted to the latter and receive a transverse square bar 32, to which latter are connected both the disks 33 and the carrier or ground wheels 34. The former are journalled on arbors 35 carried by brackets 36 pivoted at 37 to arms 38 adjusting slots 39 and bolts 40, being provided for adjusting and locking said brackets to adjust the angle of the disks. The arms 38 are pivoted to brackets 41 a similar slot-and-bolt adjustment 42 being provided for varying the angle of the arms to adjust the spacing of the disks. Brackets 41 are attached to the last mentioned square bar 32. The ground wheels 34, above mentioned are journalled on arbors 43 bolted on the lower ends of the respective arms 44 secured to said square shaft 32 as best seen in Fig. 3. The position of the disks and wheels may be adjusted by swinging the brackets 31 about their pivot bolts 31a by means of the hand lever 45 connected to the wheel carrying arms 44 by links 46. Lever 45 may be locked in adjusted position by rack 47 and the usual pawls and trigger construction. Thus the depth of operation of the pair of disks and of the pair of shovels can be independently adjusted.

Except in the respects hereinafter pointed out the construction and operation of the side gangs (which are substantially alike) are like those of the rudder gang just described. The U-bar 48 of each side gang, however, is connected to the transverse beam 6 of the main frame by parallel motion links 49 so that said gangs may swing from side to side to the extent necessary to follow the ridges or trenches on which they are respectively operating, notwithstanding any ordinary irregularities of the latter, and yet, the U-bar and the connected gang will maintain their angular relation to the direction of movement of the main frame (see Figs. 1, 2 and 4).

Figure 4:
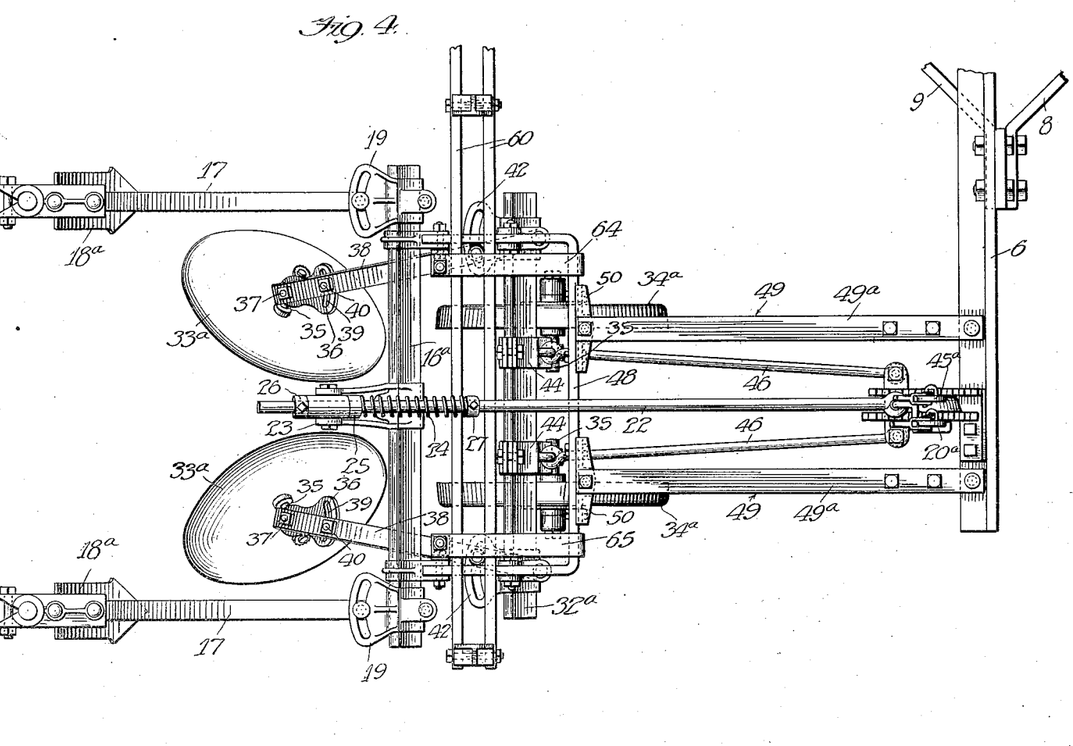
Fig. 4 a plan on an enlarged scale of one of the side cultivator units and Fig. 5 a similar view of the central portion of the implement.

As seen in Figs. 2 and 4 the links are of strap metal and each comprises an upper member 49a and a lower member 49b pivoted at their forward ends respectively on the upper and lower sides of the transverse beam of the main frame, and spread at their rear ends and pivoted to the upper and lower ends respectively of brackets 50 secured to the U-bar.

The U-bar of each side gang carries the square bars 16a, 32a to which respectively the shovels 18a and the disks 33a and wheels 34a are attached, as does the U-bar of the rudder or centre gang. The levers 20a 45a for adjusting the shovels and disks, respectively of the side gangs are pivoted on the transverse beam 6 of the main frame on which also are located the rack segments for locking said levers in position.

In order to prevent tilting of the gang units and of the implement as a whole I provide connections between the gangs which while not interfering with their lateral movements with respect to each other serve to prevent their tilting sidewise. In the preferred construction illustrated in the drawings I have provided two bars, each formed of a pair of small I-beams, tied together at intervals for the sake of lightness and strength, both of said double bars anchored to the central or rudder gang and extending in opposite directions therefrom respectively and having a sliding connection with the respective side gangs.

Referring to Figs. 1, 3 and 5, the two members forming the guide bar 60 extend at their inner ends over both arms 14 of the U-bar of the rudder gang. They are secured to such U-bar by a small plate 61 extending between and engaging the flanges of the members of the bar 60 and they are held in position by means of a bolt 62 and nut 63. This bolt 62 passes upwardly through a bracket bolted to the U-bar, then through the bolt 61 to receive the nut 63 so that it can be tightened from above as particularly shown in Fig. 5.

The outer end of the bar 60 extends over the side arms of the U-bar of one of the side gangs to-wit, that at the right as seen in Figs. 1 and 4 and is held or guided by a pair of straps 64, 65, the front ends of which are bent down at 66 and bolted to the front face of the U-bar 48 of said gang as shown in Fig. 2. At their rear ends the strap guides are secured to brackets or angle irons 67 bolted to the side members of the U-bar. The space between the strap guides and the U-bar is just sufficient to permit the bar 60 to slide easily therein and of such length as not to interfere with the swinging movement of the gang. Thus the gang in question can freely swing from side to side as the ground or carrying wheels follow the irregularities of the ridge or trench on which it is operating but tilting is prevented by the engagement of the bar 60, secured at its inner end to the rudder gang, with the U-bar and strap guides on the latter. As the side gang is slightly in advance of the rudder gang the transverse guide bar 60 is bent at 68 intermediate said gangs to bring the ends thereof into proper relation with the respective U-bars.

A somewhat similar arrangement prevents tilting of the left hand gang, as seen in Fig. 1. The U-bar of this gang is similarly provided with guide straps between which and the U-bar the outer end of a double guide-bar 70 is received in such manner that the gang is freely movable in and out, thereon but is prevented from tilting thereby. The inner ends of the two members forming this guide-bar 70 straddle and are pivoted or bolted to a lug or bracket 71 mounted on the front face of the U-bar of the rudder gang and extending above the latter. The effect of this construction to prevent tilting of the left hand gang unit is obvious.

Manifestly the engagement of the bar 60, previously described, with the arms of the U-bar of the central gang unit prevents tilting of the latter. Thus the side gangs are free to swing in and out, are held against tilting by the transverse guide bars and maintained in parallel relation to the line of travel by the parallel motion links. Each gang may thus follow the bends and irregularities of the ridge or trench upon which it is working irrespective of the other group or the varying distances between the ridges in "ridge busting", the other units being similarly free to follow the adjoining trenches or ridges as the case may be. The ground or carrier wheels and the disks will, of course, be adjusted as usual according to the work to be performed.

Figures 6, 7, 8:
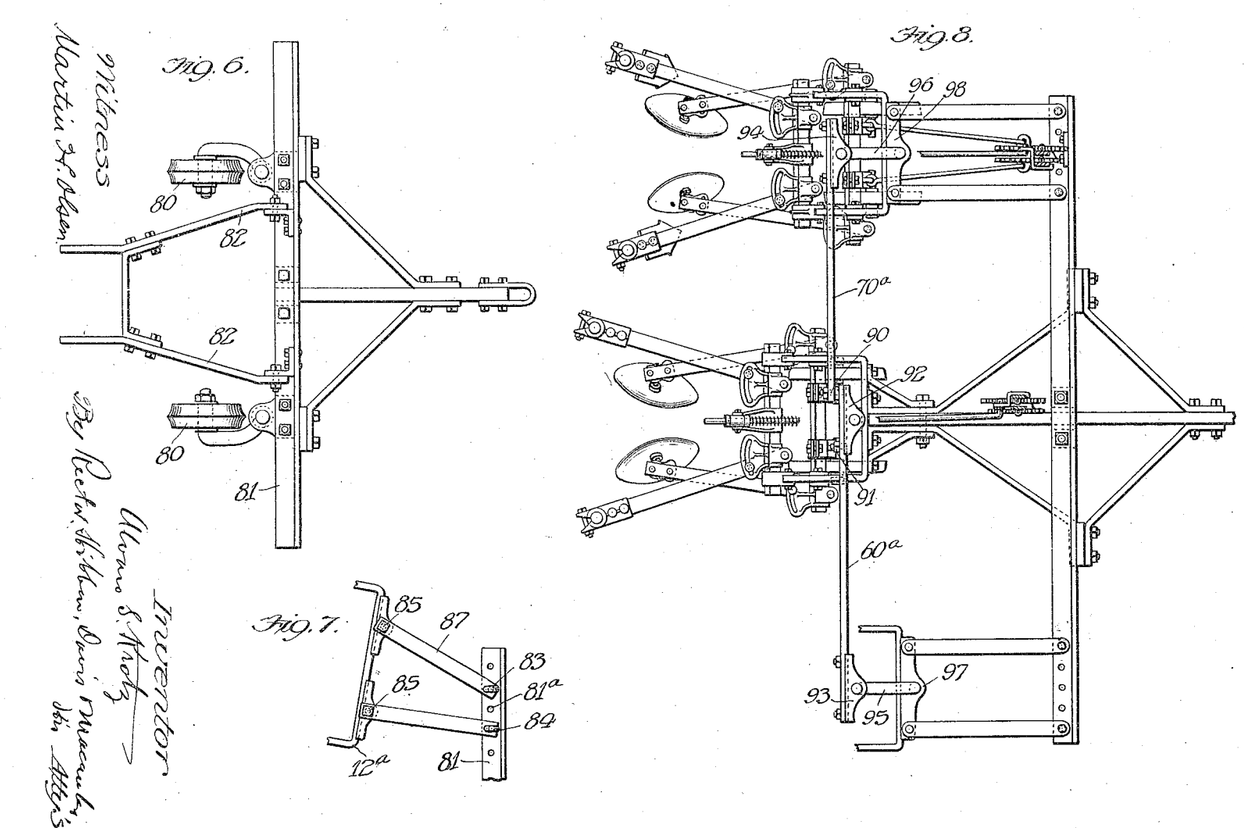
Figs. 6, 7 and 8 are plan views of certain parts of a slightly different form of the invention.

Manifestly, if desired the main frame may also be equipped with ground or carrying wheels or casters which may be mounted on the transverse beam thereof, and will prevent tipping of the main frame. In this case, it is preferable that the rudder unit be also free to move up and down with reference to said main frame. Such a construction is shown in Fig. 6 in which the casters 80 are mounted on the main transverse beam 81, and the U-bar of the rudder gang unit is connected to said beam by the braced links 82. Or, if desired, the main frame may be supported on the tracks.

It is also to be observed that the links of the pairs by which the side units are attached to the transverse bar need not be parallel. Thus as shown in Fig. 7 they may be pivoted nearer together on the transverse bar as at 83, 84 than on U-bar 12a as at 85, 86, or the links may even be pivoted on a common axis, as by pivoting both links 87 in the bearing orifice 81a in the transverse beam 81.

Again it is not necessary that the guide bars be arranged to slide with respect to the gang units or any of them. Thus in Fig. 8 guide bars 60a, 70a are bolted at 90, 91 to a plate 92 secured to the U-bar of the rudder unit and the ends of the respective bars carry bearings 93, 94 in which are journalled respectively the ends of levers 95, 96 the other ends of which are journalled in bearing plates 97, 98 secured to the U-bars of the respective side gang units. Obviously the units are free to swing in and out but the guide bars and lever constructions just described will prevent tilting. Other obvious changes may be made without departing from my invention.

I claim:

1. In an implement of the class described, a main frame having a transverse member and a longitudinal draft member, a central rudder gang unit so connected to the transverse member as to have no lateral movement relative thereto, side gang units arranged respectively on opposite sides of the central rudder gang unit, lateral movement links pivotally connecting the side gang units with the transverse member, and a pair of transverse bars to the rear of said transverse member, one of said bars being connected to one of said side gang units and the other bar connected to the other said side gang unit and both of said bars engaging the central rudder gang unit, the connections of said bars being such as to permit substantial and free relative lateral movement between the side gang units and with respect to the central gang unit as provided by said links but without relative side tipping of said units.

2. In an implement of the class described, a main frame having a transverse front member, a central rudder gang unit trailing and so connected to the transverse member as to prevent lateral movement of the unit with respect thereto, a pair of side gang units each side gang unit being directly connected to the transverse member by a pair of parallel motion links providing self-adjusting lateral swing movement, and means connecting each of the side gang units and the central gang unit for preventing relative tipping of the units.

3. In an implement of the class described, a main frame including a rigid transverse member and a central longitudinal member adapted for connection to draft means, a central rudder gang unit, side gang units, each of said units being independently connected to the transverse member of said frame, the connections between each of said side units and said transverse member comprising parallel motion links whereby said side units are each free to swing sideways independently of the other and independently of said rudder unit, said links being adapted to maintain said side units regardless of side swing in a substantially parallel relation to the direction of travel, and lateral slide connections between each of said side units and said rudder unit for preventing side tipping of said side units.

4. In an implement of the class described, a main frame comprising a transverse member and a central longitudinal member, a central guide gang unit associated with said longitudinal member to the rear of said transverse member, side gang units carried forwardly of said guide gang unit, and means for connecting said side units rearwardly of and to said transverse member, said means including parallel links between each of said side units and said transverse member whereby said side units are free to swing sideways independently of each other and said guide unit but are maintained in parallel relation to the general direction of travel of the implement as a whole, and transverse bars disposed rearwardly of said transverse member, each secured at the inner ends to the central guide unit and having sliding connection at the outer ends with the side gang units to prevent side tipping of said side units without interfering with the side swing movement of said side units.

5. In an implement of the class described, a main frame comprising a transverse member, a central draft connection, a central gang unit so secured to said transverse member as to have no lateral movement with respect thereto, side gang units connected to the transverse member on opposite sides respectively of the central units by connections which permit lateral swing of said side units with respect to said transverse member, each other, and said central rudder gang unit, and connections between each of said side units and said central unit to prevent side tipping of said side units.

6. In an implement of the class described, a main frame including a transverse member, a central rudder gang unit trailing said transverse member, side gang units trailing said transverse member, means providing for side swing movement of said side gang units only, and connections between the central rudder gang unit and the side gang units to prevent tipping of said side units relative to said central unit, said connections including a plurality of transverse bars disposed in paired relation, each pair of bars secured at the inner end to the central rudder gang unit and having slide connection at the outer end with a side gang unit to accommodate lateral swing movement of said side unit.

7. In an implement of the class described, a main frame including a forwardly located transverse member adapted to be supported forwardly by means for imparting motion to the implement as a whole, a centrally located rudder gang unit non-swingable laterally with respect to side transverse member, said gang units located forwardly of said rudder gang unit, means for self-adjustment of each side unit sidewise as a whole with respect to each other and said rudder unit and for maintaining each side unit regardless of side swing in its substantially parallel relation to the direction of travel, and means for preventing side tipping of said side units.

In testimony whereof, I have subscribed my name.

ALVARO S. KROTZ.

CERTIFICATE OF CORRECTION.

Patent No. 1,852,120.                                          Granted April 5, 1932, to

ALVARO S. KROTZ.

It is hereby certified that error appears in the printed specification of the above numbered patent requiring correction as follows: Page 4, line 25, claim 7, for the word "side" read said, and same line, for "said" read side; and that the said Letters Patent should be read with these corrections therein that the same may conform to the record of the case in the Patent Office.

Signed and sealed this 21st day of June, A. D. 1932.

M. J. Moore,
(Seal)                                                        Acting Commissioner of Patents.